US012355813B2

(12) United States Patent
Fox

(10) Patent No.: US 12,355,813 B2
(45) Date of Patent: *Jul. 8, 2025

(54) SYNTHETIC IDENTITY SIGNAL NETWORK

(71) Applicant: CAPITAL ONE SERVICES, LLC, McLean, VA (US)

(72) Inventor: Ryan Fox, Lebanon, OH (US)

(73) Assignee: Capital One Services, LLC, McLean, VA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/369,518

(22) Filed: Sep. 18, 2023

(65) Prior Publication Data

US 2024/0007501 A1 Jan. 4, 2024

Related U.S. Application Data

(63) Continuation of application No. 17/454,905, filed on Nov. 15, 2021, now Pat. No. 11,799,907, which is a continuation of application No. 16/709,540, filed on Dec. 10, 2019, now Pat. No. 11,178,179.

(60) Provisional application No. 62/777,610, filed on Dec. 10, 2018.

(51) Int. Cl.
*H04L 9/40* (2022.01)
*G06Q 40/03* (2023.01)
*H04L 67/306* (2022.01)

(52) U.S. Cl.
CPC ......... *H04L 63/1483* (2013.01); *G06Q 40/03* (2023.01); *H04L 67/306* (2013.01)

(58) Field of Classification Search
USPC .......................................................... 726/24
See application file for complete search history.

(56) References Cited

U.S. PATENT DOCUMENTS

| | | | |
|---|---|---|---|
| 7,546,271 B1 * | 6/2009 | Chmielewski | G06Q 30/0185 705/38 |
| 9,674,214 B2 | 6/2017 | Foster et al. | |
| 2007/0244807 A1 | 10/2007 | Andringa et al. | |
| 2009/0164232 A1 | 6/2009 | Chmielewski et al. | |
| 2010/0293090 A1 | 11/2010 | Domenikos et al. | |
| 2013/0249796 A1 | 9/2013 | Sugishita | |
| 2014/0172669 A1 | 6/2014 | Hecht et al. | |
| 2016/0012561 A1 * | 1/2016 | Lappenbusch | G06Q 50/16 705/325 |

(Continued)

FOREIGN PATENT DOCUMENTS

| | | | | |
|---|---|---|---|---|
| CN | 101690109 B | * | 4/2013 | ....... G06F 17/30867 |
| ES | 2975067 T3 | * | 7/2024 | ......... G06F 16/2379 |

*Primary Examiner* — Sakinah White Taylor
(74) *Attorney, Agent, or Firm* — Foley & Lardner LLP

(57) ABSTRACT

A synthetic identity network for detecting synthetic identities may receive a first request for credit including one or more user attributes, compare the one or more user attributes to one or more stored user identities, create a new user identity, flag the new user identity as a potentially synthetic identity based on comparing the one or more user attributes to the one or more stored user identities, receive a second request for credit including or more second user attributes, compare the one or more second user attributes to the one or more user attributes associated with the potentially synthetic identity, prepare a notice including the potentially synthetic identity and a credit request identifier, and transmit the notice to one or more servers.

20 Claims, 6 Drawing Sheets

(56) References Cited

U.S. PATENT DOCUMENTS

| | | | |
|---|---|---|---|
| 2016/0055244 A1* | 2/2016 | Wang | G06F 16/337 |
| | | | 707/770 |
| 2016/0071208 A1* | 3/2016 | Straub | G06Q 40/03 |
| | | | 705/38 |
| 2016/0086262 A1* | 3/2016 | Straub | G06Q 50/265 |
| | | | 705/38 |
| 2016/0179806 A1 | 6/2016 | Mortensen et al. | |
| 2016/0344758 A1 | 11/2016 | Cohen et al. | |
| 2018/0114017 A1 | 4/2018 | Leitner et al. | |
| 2019/0089711 A1 | 3/2019 | Faulkner | |
| 2019/0164173 A1 | 5/2019 | Liu et al. | |
| 2020/0145436 A1 | 5/2020 | Brown et al. | |
| 2020/0316477 A1 | 10/2020 | Krietzman et al. | |

\* cited by examiner

User Profile 500

Personal Name 502

Personal Address 504

Personal Phone Number 506

Personal Social Security Number 508

Synthetic Flag 510

*FIG. 5*

SYNTHETIC IDENTITY SIGNAL NETWORK

CROSS-REFERENCE TO RELATED APPLICATIONS

This is a continuation of U.S. application Ser. No. 17/454,905, filed November 15, 2021, which is a continuation of U.S. application Ser. No. 16/709,540, filed Dec. 10, 2019, now U.S. Pat. No. 11,178,179, issued Nov. 16, 2021, which claims priority to U.S. Application Ser. No. 62/777,910, filed Dec. 10, 2018, which are incorporated by reference in their entirety.

TECHNICAL FIELD

The present disclosure relates generally to methods and systems for tracking and identifying synthetic identities and attributes, and signaling entities to the presence of synthetic identities and attributes.

BACKGROUND

Over time, individuals may assemble random attributes that may be associated with an individual, for example a name and an address. Such individuals may apply for financial products available at financial institutions and other entities that provide financial services using assembled attributes that may or may not be related to the identity of the individual. Some individuals may assemble such information for fraudulent purposes, for example to apply for credit with the hope of obtaining a line of credit that can be used for personal means. The assembled information may be verified or cross-referenced against data records of a credit bureau or other tracking entity, upon which an approval or rejection or other risk metric or determination may be output. A user application may be rejected, or the application associated with high risk, if the assembled information cannot be fully verified against a valid, existing data record at the credit bureau. Commonly, new data records or new credit profiles may be created for the assembled information only when the application is approved, or a line of credit opened, for example. Thus if such individuals, after applying for credit, are rejected by a financial institution, the assembled information or attributes relating to the request may not be recorded by credit bureaus and other credit tracking entities. Such assembled information or other combinations of similar information may then again be assembled for purposes of obtaining a line of credit with another financial institution, and this may continue until a line of credit is finally opened by a financial institution. Because the credit bureau may not keep records of assembled information that do not result in opening of a line of credit, such activity may go unnoticed. And once an assembled "identity" is granted a line of credit, the identity is recorded by the bureau and typically assumed to be a valid identity. Such assembled information may be subsequently used to successfully open a small line of credit and to build a credit profile that may then be used to open a larger line of credit exposing financial institutions to greater opportunities of fraud. For example, in some instances, subsequent credit inquiries may find a match for the assembled "fictitious" identity record stored in a credit tracking entities' electronic systems, which may eventually be used to obtain credit despite being a fictitious identity record.

The example embodiments provide a solution for tracking assembled identity information and monitoring such "identities" and identity information for indicators of fraudulent attempts for obtaining credit.

SUMMARY

Systems and methods described herein may provide for identifying synthetic identities and signaling the presence of synthetic identities and synthetic attributes over a network.

For example, a method for detecting synthetic identities may include receiving a first request for credit, the first request including one or more user attributes, the one or more user attributes including one or more of a personal name, a personal address, a personal social security number, and a personal telephone number; comparing, by a user identity server, the one or more user attributes to one or more stored user identities, each of the one or more stored user identities including one or more of a name, an address, a social security number, and a telephone number; creating a new user identity, the new user identity including the one or more user attributes; flagging the new user identity as a potentially synthetic identity based on comparing the one or more user attributes to the one or more stored user identities; receiving a second request for credit, the second request including one or more second user attributes, the one or more second user attributes including one or more of the personal name, the personal address, the personal social security number, and the personal telephone number; comparing, by the user identity server, the one or more second user attributes to the one or more user attributes associated with the potentially synthetic identity; preparing a notice, the notice including at least the potentially synthetic identity and a credit request identifier, the notice transmitted based on comparing the one or more second user attributes to the one or more user attributes associated with the potentially synthetic identity, the credit request identifier indicating the notice relates to the second request for credit; and transmitting the notice to one or more financial servers, In some embodiments, the method may include the one or more stored user identities are stored prior to receiving the first request for credit.

In some embodiments the method may include comparing the one or more user attributes to the one or more stored user identities results in no matches.

In some embodiments the method may include prior to receiving the second request for credit, flagging one or more of the one or more user attributes associated with the new user identity as a potentially synthetic attribute; and transmitting a second notice, the second notice including at least the one or more flagged user attributes associated with the flagged potentially synthetic attribute.

In some embodiments, the method may include receiving a third request for credit, the third request including one or more third user attributes, the one or more third user attributes including one or more of the personal name, the personal address, the personal social security number, and the personal telephone number; comparing the one or more third user attributes to the one or more user attributes associated with the potentially synthetic identity; and flagging one or more of the one or more user attributes associated with the potentially synthetic attribute.

In some embodiments, the method may include flagging the new user identity as a synthetic identity.

In some embodiments, the method may include receiving a third request, the third request including one or more third user attributes, the one or more third user attributes including one or more of the personal name, the personal address, the personal social security number, and the personal telephone number; comparing the one or more third user attributes to the one or more user attributes associated with the potentially synthetic identity; and transmitting a second notice, the second notice indicating the third request relates to the potentially synthetic identity, the second notice transmitted based on comparing the one or more third user attributes to the one or more user attributes associated with the potentially synthetic identity.

In some embodiments, the method may include transmitting a broadcast notice to one or more financial servers, the broadcast notice including at least one or more of the user attributes associated with the potentially synthetic identity; and in response to transmitting the broadcast notice, receiving a response notice from the one or more financial servers, the response notice including a synthetic match identifier, the synthetic match identifier indicating the one or more of the user attribute associated with the potentially synthetic identity is associated with a second user identity, the second user identity different from the new user identity.

As another example, a method for detecting synthetic identities may include receiving a first request for credit, the first request including one or more user attributes, the one or more user attributes including one or more of a personal name, a personal address, a personal social security number, and a personal telephone number; comparing, by a user identity server, the one or more user attributes to one or more stored user identities, each of the one or more stored user identities including one or more of a name, an address, a social security number, and a telephone number; flagging one or more of the one or more user attributes based on comparing the one or more user attributes to the one or more stored user identities; receiving a second request for credit, the second request including one or more second user attributes, the one or more second user attributes including one or more of the personal name, the personal address, the personal social security number, and the personal telephone number; comparing, by the user identity server, the one or more second user attributes to the one or more flagged user attributes; generating, by the user identity server, a notice, the notice including at least the flagged one or more user attributes and a fraud identifier, the fraud identifier indicating the second request is a fraudulent request for credit, the notice transmitted based on comparing the one or more second user attributes to the one or more flagged user attributes; and transmitting the notice to one or more financial servers, In some embodiments, the method may include the one or more stored user identities are stored prior to receiving the first request for credit.

In some embodiments, the method may include the comparing the one or more user attributes to the one or more stored user identities results in a partial match.

In some embodiments, the method may include prior to receiving the second request for credit, transmitting a preliminary notice, the preliminary notice including at least the one or more flagged user attributes.

In some embodiments, the method may include receiving a third request for credit, the third request including one or more third user attributes, the one or more third user attributes including one or more of the personal name, the personal address, the personal social security number, and the personal telephone number; comparing the one or more third user attributes to the one or more flagged user attributes; and marking the one or more flagged user attributes as a synthetic attribute.

In some embodiments, the method may include in response to flagging one or more of the one or more user attributes based on comparing the one or more user attributes to the one or more stored user identities, flagging the one or more stored user profiles.

In some embodiments, the method may include flagging the new user identity as a synthetic identity.

In some embodiments, the method may include receiving a third request for credit, the third request including one or more third user attributes, the one or more third user attributes including one or more of the personal name, the personal address, the personal social security number, and the personal telephone number; comparing the one or more third user attributes to the one or more flagged user attributes; and transmitting a second notice, the second notice indicating the third request relates to the one or more flagged user attributes, the second notice transmitted based on comparing the one or more third user attributes to the one or more flagged user attributes.

In some embodiments, the method may include transmitting a broadcast notice to one or more financial servers, the broadcast notice including at least one or more of the flagged user attributes; and in response to transmitting the broadcast notice, receiving a response notice from the one or more financial servers, the response notice including a synthetic match identifier, the synthetic match identifier indicating the one or more of the flagged user attributes is associated with a synthetic identity, the synthetic identity different from the one or more stored user identities.

As another example, a system configured to signal detection of a synthetic identity may include a processor; and a non-transitory memory storing instructions that, when executed by the processor, cause the processor to perform processing. The software instructions may be configured to receive a first request for credit, the first request including one or more user attributes, the one or more user attributes including one or more of a personal name, a personal address, a personal social security number, and a personal telephone number; compare the one or more user attributes to one or more stored user identities, each of the one or more stored user identities including one or more of a name, an address, a social security number, and a telephone number; flag one or more of the one or more user attributes based on comparing the one or more user attributes to the one or more stored user identities; receive a second request for credit, the second request including one or more second user attributes, the one or more second user attributes including one or more of the personal name, the personal address, the personal social security number, and the personal telephone number; compare the one or more second user attributes to the one or more flagged user attributes; and generate a notice, the notice including at least the flagged one or more user attributes and a fraud identifier, the fraud identifier indicating the second request is a fraudulent request for credit, the notice transmitted based on comparing the one or more second user attributes to the one or more flagged user attributes.

In some embodiments, the one or more stored user identities are stored prior to receiving the first request for credit.

In some embodiments, the comparing the one or more user attributes to the one or more stored user identities results in a partial match.

In some embodiments, the software instructions may be further configured to prior to receiving the second request for credit, transmit a preliminary notice, the preliminary notice including at least the one or more flagged user attributes.

In some embodiments, the software instructions may be further configured to receive a third request for credit, the third request including one or more third user attributes, the one or more third user attributes including one or more of the personal name, the personal address, the personal social security number, and the personal telephone number; compare the one or more third user attributes to the one or more flagged user attributes; and mark the one or more flagged user attributes as a synthetic attribute.

In some embodiments, the software instructions may be further configured to transmit a broadcast notice to one or more financial servers, the broadcast notice including at least one or more of the flagged user attributes; and in response to transmitting the broadcast notice, receive a response notice from the one or more financial servers, the response notice including a synthetic match identifier, the synthetic match identifier indicating the one or more of the flagged user attributes is associated with a synthetic identity, the synthetic identity different from the one or more stored user identities.

BRIEF DESCRIPTION OF THE FIGURES

FIG. 5 shows a block diagram of a user profile that may include a synthetic identifier according to an embodiment of the present disclosure.

DETAILED DESCRIPTION OF THE EMBODIMENTS

Figure 1:
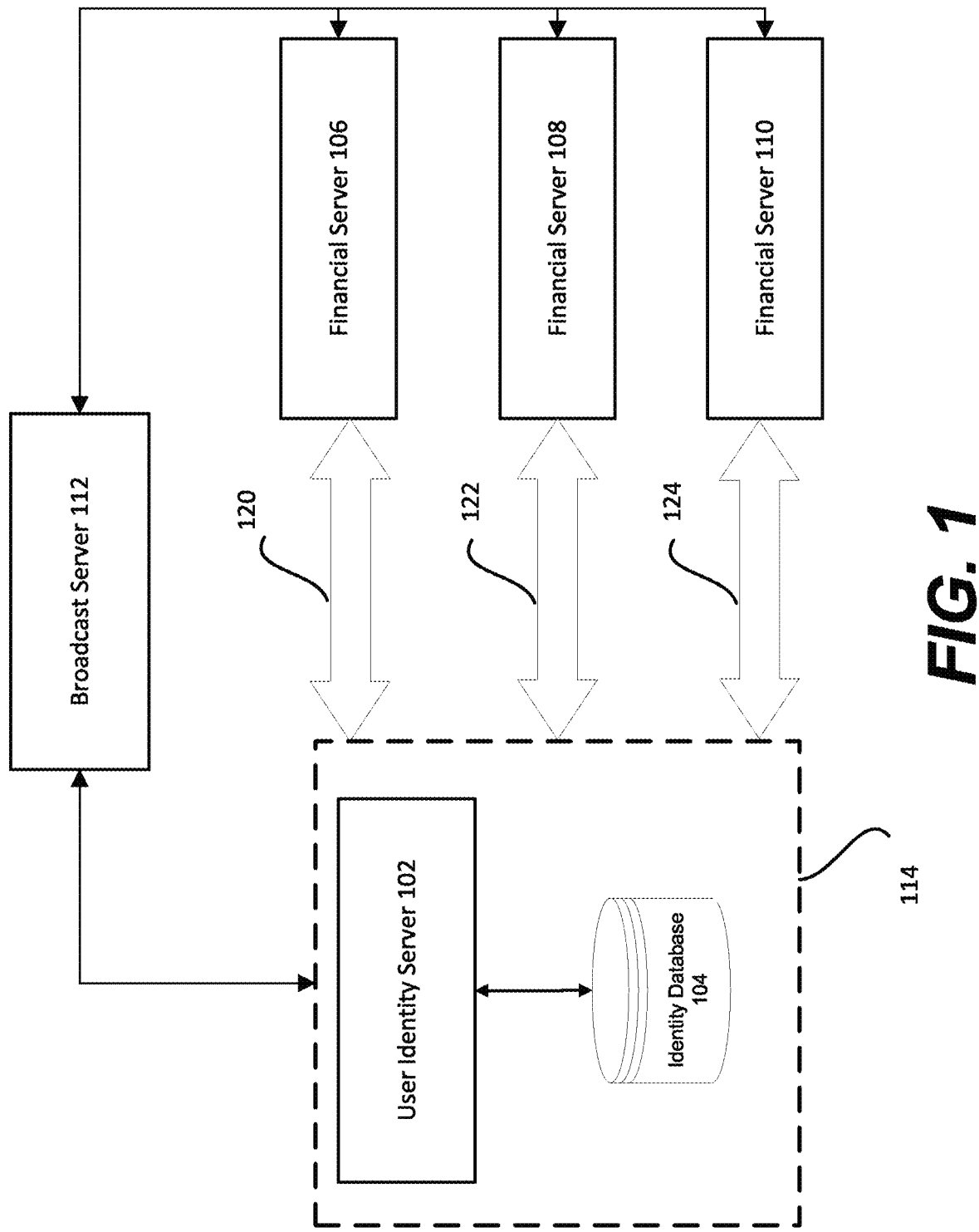
FIG. 1 shows a block diagram for a synthetic identity network according to an embodiment of the present disclosure.

Reference will now be made in detail to exemplary embodiments of the present disclosure, examples of which are illustrated in the accompanying drawings and described herein. In the drawings, like reference numerals are sometimes used to designate like structural elements. It should also be appreciated that the depictions in the figures are diagrammatic and not to scale.

The present disclosure relates generally to methods and systems for tracking and identifying synthetic identities and attributes, as well as signaling entities such as financial institutions to the presence of synthetic identities and attributes. Tracking and identifying synthetic and potentially synthetic information can be performed by a synthetic identity network that assists in preventing fraudulent requests, such as a fraudulent request for a credit line, such that credit requests are denied and the information submitted with the credit request may be tracked and identified such that it may not be used in the future to obtain credit fraudulently.

The synthetic identity network may include for example a user identity server, and the user identity server may include a synthetic identity service including logic for detecting synthetic identities and synthetic attributes. The user identity server may run an operating system and receive information relating to credit requests, including information included with credit requests, and communicate with an identity database that may store the information. The user identity server may receive requests for credit and compare information included with the credit requests with existing user profiles or existing user attributes. In some embodiments, if the user identity server receives a credit request that is not associated with an existing user profile, the user identity server may create a new user profile, and in some embodiments may flag the newly created user profile, for example if the information submitted with the request indicates unusual qualities, such as an initial request for credit by an individual in their 40's and who has never applied for credit before. The synthetic identity network may include a broadcast server, or be in communication with a broadcast server. The broadcast server may be used to communicate with third party servers, for example servers owned and maintained by financial entities, and may communicate information indicating a user profile or an attribute associated with a user profile is synthetic.

The identity database may store user identities and attributes associated with user identities. The identity database may also store historical information relating to how a user profile or an attribute associated with a user profile has changed over time. In some embodiments, the user identity server may use such historical information to determine whether information included with a credit request is associated with a user profile, and that the user profile is not a synthetic identity, or that the user profile is a synthetic identity, based on the historical information.

FIG. 1 is a block diagram of a user identity server that may be used to identify information associated with a synthetic identity or synthetic attribute and to signal other entities regarding the synthetic identity and/or synthetic attributes in accordance with an embodiment of the present disclosure. The network may include a user identity server 102, and may further include an identity database 104 in communication with the user identity server 102. The user identity server 102 and identity database 104 may be part of a synthetic identity network 114, and in some embodiments the synthetic identity network 114 may be used to track either synthetic identities or synthetic attributes associated with a user identity.

The user identity server 102 may communicate with one or more of financial server 106, financial server 108, and financial server 110, as shown in FIG. 1. For example, the user identity server may receive information relating to a credit request from financial server 106. In some embodiments, synthetic identity network may include a financial server, and the user identity server 102 may communicate with one or more financial servers in synthetic identity network 114. For example, the user identity server 102 may receive information relating to a request for credit from a financial server in synthetic identity network 114, such that the user identity server and the financial server are located in the same network. In some embodiments, the logic for user identity server 102 and a financial server in synthetic identity network 114 may be located on a server.

Each of financial server 106, financial server 108, and financial server 110 may communicate with user identity server 102 through dedicated communication channels, or through a secure connection over a network, such as the Internet. As shown in FIG. 1, financial server 106 may include a communication path 120 to user identity server 102 (through synthetic identity network 114), financial server 108 may include a communication path 122 to user identity server 102, and financial server 110 may include a communication path to user identity server 102. In some embodiments, each of financial server 106, financial server 108, and financial server 110 may communicate with a dedicated routing server (not shown in FIG. 1) that may manage communications between external financial servers and servers located within synthetic identity network 114.

FIG. 1 also shows a broadcast server 112. The broadcast server 112 may include logic for transmitting alert messages to one or more of financial server 106, financial server 108, and financial server 110. In some embodiments, the broadcast server 112 may transmit an alert message including a synthetic identifier. The synthetic identifier may be used for example to identify a user identity that is synthetic (i.e., a fraudulent user identity), and in some embodiments the synthetic identifier may be used to identify an attribute that can be itself identified as a fraudulent attribute, or may be associated with a user identity that is synthetic.

The broadcast server 112 may be in communication with user identity server 102 through synthetic identity network 114. In some embodiments, user identity server 102 may transmit a request to broadcast an alert message to one or more of financial server 106, financial server 108, and financial server 110, for example to signal the other financial servers that information relating to a user profile has been either identified as synthetic, or potentially synthetic.

The alert message request that may be sent from user identity server 102 to broadcast server 112 may include a synthetic identifier and information relating to a user profile. In some embodiments, synthetic identity network 114 includes broadcast server 112. For example, one or more financial servers may register with the broadcast server 112 in order to receive alerts regarding a synthetic user profile or user attribute, or potentially synthetic user profile or user attribute.

Identity database 104 may be used to store user profiles, including attributes relating to a user profile, such as a personal name, a personal address, a social security number, and other information used to identify an individual. The identity database may also be used to store user attributes, and in some embodiments the user attributes may be associated with a user profile, and in other embodiments the user attributes are not associated with a user profile.

Identity database 104 may include logic for tracking credit requests including user attributes or a user profile over time, such that the identity database 102 can store relationships that may be used to identify potentially synthetic user profiles or potentially synthetic user attributes, as well as synthetic user profiles or synthetic user attributes. In some embodiments, the historical information may be used to identify relationships between user profiles and user attributes.

Figure 2:
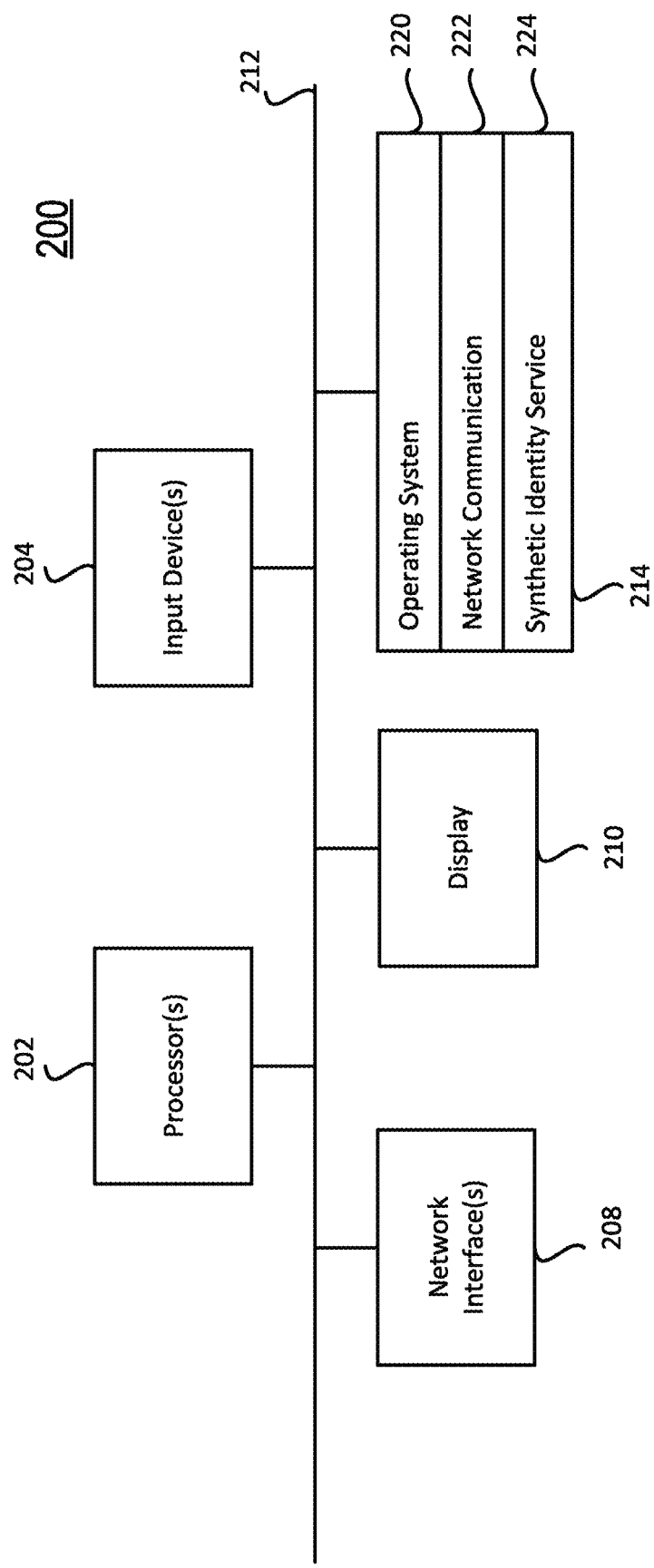
FIG. 2 shows a block diagram of a server device according to an embodiment of the present disclosure.

FIG. 2 is a block diagram of an exemplary user identity server 200 that may implement various features and processes as described herein. The user identity server 200 may be implemented on an electronic device that runs software applications derived from compiled instructions, including without limitation personal computers and servers. In some implementations, the user identity server 200 may include one or more processors 202, one or more input devices 204, one or more display devices 206, one or more network interfaces 208, and one or more computer-readable mediums 210. Each of these components may be coupled by bus 212. In some embodiments, user identity server 200 may include one or more processors 202, one or more network interfaces, and one or more computer-readable mediums, and may be accessed, for example for maintenance, by an external device, such as a personal computer.

Computer-readable storage medium 214 may include various instructions for implementing an operating system 220, for example a server operating system software. The operating system may be multi-user and include multiprocessing, multitasking, multithreading, real-time, and other capabilities. The operating system may perform basic tasks, including but not limited to recognizing input from input device 204, sending output to display device 210, maintaining files and directories on computer-readable medium 214, controlling peripheral devices (e.g., disk drives, printers, etc.) that may be controlled either directly or through an I/O controller, and managing traffic on bus 212. Network communications instructions 222 may establish and maintain network connections (e.g., software for implementing communication protocols, such as TCP/IP, HTTP, Ethernet, telephony, etc.).

The computer-readable storage medium 214 may further include instructions for implementing a synthetic identity service 224. The synthetic identity service may include instructions for performing the various methods and processes described herein.

Figure 3:
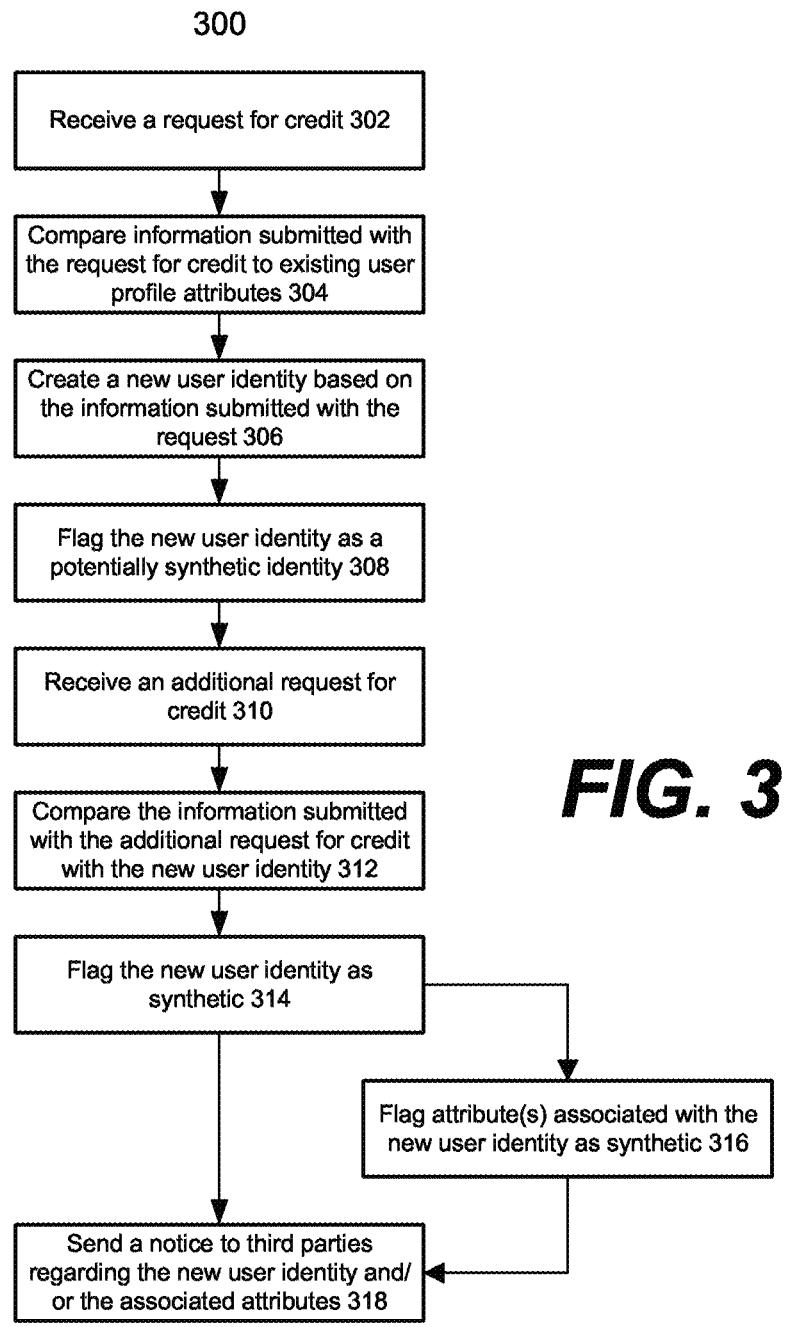
FIG. 3 shows a process for identifying a synthetic identity according to an embodiment of the present disclosure.

FIG. 3 shows a process for identifying a synthetic identity according to an embodiment of the present disclosure. The user identity server may be used to perform some or all of the steps of the process shown, and in some embodiments, the synthetic identity service is located on user identity server and performs some or all of the steps of the process shown. In other embodiments, synthetic identity service may perform some or all of the steps of the process shown, and may be located on a server other than user identity server. In some embodiments, one or more APIs relating to the user identity server may be used to perform some or all of steps of the process shown.

At step 302, a request for credit is received. In some embodiments, the credit request is based on another request originally submitted to a financial institution. In some embodiments, the credit request may be an original request submitted from a financial institution, through for example a financial server associated with the financial institution. The credit request may contain attributes relating to a user, for example a personal name, a personal address, a social security number, and other information relating to an individual, as well as other information often submitted with a request for credit or relating to a financial request in some manner. Other information may include a phone number, an e-mail address, and other information that can be used to identify an individual.

At step 304, the credit request, including information that may be included with the request, is compared to an existing user profile. The user profile server may for example perform this comparison. In some embodiments, information included with the credit request is compared to a user attribute that may or may not be associated with an existing user profile.

For example, user identity server may receive data relating to a credit request, and the data may include the following information: John Smith (i.e., a personal name), 1234 1st Street, Menlo Park, California, 98765-1234 (i.e., a personal address), XXX-XX-6789 (i.e., a social security number), as well as other attributes, including for example a date of birth (e.g., Jan. 1, 1971). Upon receipt of the credit request, the user profile server may compare one or more of the attributes obtained from the data with attributes associated with one or more user profiles. For example, the user profile server may compare the name included with the credit request (i.e., "John Smith") with a personal name (i.e., a name attribute) associated with one or more user profiles. The user identity server may include logic for comparing multiple credit request attributes (e.g., a personal name and an address) with multiple attributes associated with a user profile (e.g., a user profile name and a user profile address).

In some embodiments, the user profile server may include logic for determining whether information included with a credit request is likely to include common information, for example a common name like "John Smith," and automatically include more information as a basis to compare with attributes associated with existing user profiles.

At step 306, the user identity server may create a new user identity based on the information submitted with the credit request in the previous step. In some embodiments, the user identity server may create the new user identity if the server does not find an existing user profile that matches the attributes associated with the credit request. In other embodiments, the user identity server may find a match (i.e., an existing user profile with the same attributes as the attributes included with the credit request). In some embodiments, if the comparison of the attributes included with the credit request with attributes associated with user profiles results in partial matches (i.e., some attributes included with the credit request match some attributes associated with a user profile), the user identity server may apply logic to determine whether to create a new user identity, update an existing user identity based on the attributes included with the credit request, or flag an existing user identity as potentially synthetic (or as synthetic).

At step 308, the user identity server may flag the newly created user identity as a potentially synthetic identity. The user identity server may flag the new user identity if, for example, one or more of the attributes included with the credit request contain known synthetic information (e.g., a non-existent or non-issued social security number) or contains a combination of attributes that, together, have been previously flagged as potentially synthetic or synthetic. In some embodiments, until a new user profile has been verified as an authentic user (i.e., not a synthetic user), the user identity server may flag the user profile until the user identity server either confirms or receives confirmation that the user identity is a non-synthetic individual.

The new user profile may be created and stored in a database, for example an identity database. In some embodiments, the identity database may include information that can be used to identify relationships between attributes. For example, at one point in time, a first credit request may be processed by user identity server, and identity database may store a user profile including attributes included with the first credit request. At a later point in time, a second credit request that may include similar, but not overlapping attributes, may be processed by user identity server and identity database may store a new user profile including attributes included with the second credit request. At a later point in time, a third credit request that may include similar, but not overlapping attributes, may be processed by user identity server and identity database may be used to identify relationships between the third credit request and the user profiles created for the first credit request and the second credit request. The user identity server may determine for example that the first credit request included non-synthetic attributes, and the second credit request included synthetic attributes, based on information stored in identity database. Other beneficial uses of tracking attributes associated with a user profile and user profiles over time, including for identifying synthetic user profiles or synthetic user attributes, providing a history of a user attribute over time, and other benefits.

At step 310, an additional request for credit is received. The additional credit request may be received by a financial server external to the user identity server (as shown in FIG. 1), or may be received by a financial server in synthetic identity network 114. The additional credit request may include one or more attributes, including similar attribute types included with the request for credit in step 302.

At step 312, the user identity server may compare the attributes (or information) included with the additional credit request with the new user identity created in step 306. In some embodiments, the user identity server may not create a new user profile in response to the initial credit request, and may instead update a user profile or flag an attribute of a user profile as potentially synthetic or synthetic. For such embodiments, the user identity server may compare the attributes included with the additional credit request to an updated or flagged user profile, and in some embodiments may compare to attributes associated with a user profile (other than the newly created user profile).

The comparison may include comparing a single attribute type to a single attribute type (e.g., comparing a name to a name associated with a user profile), or comparing multiple attribute types to multiple attribute types (e.g., comparing a name and an address to a name and an address associated with a user profile). The comparison may further be a profile-to-profile comparison.

At step 314, the new user identity (or profile) is flagged as a synthetic identity. The user identity server may flag the new user identity, or synthetic identity service may flag the user identity as synthetic. In some embodiments, an attribute associated with a user profile is flagged as a synthetic identity, and in some embodiments, the new user identity itself or a user identity associated with the identified synthetic attribute is not flagged.

At step 316, attributes associated with the new user identity are flagged as synthetic. The user identity server, or the synthetic identity service may flag the additional attributes. For example, if a user identity (or user profile) is flagged, then the user identity server may identify other user profiles and/or attributes that may be associated with other user profiles and flag those profiles (or attributes) as synthetic. Once a user identity has been confirmed as synthetic, in some embodiments the user identity server may attempt to identify all user profiles that are related or similar to the synthetic user identity. Similarly, the user identity server may attempt to identify and flag user profiles containing an attribute that has been identified as synthetic. In some embodiments, the user profile itself is not identified as synthetic, and an attribute associated with the user profile is flagged as synthetic. In such embodiments, the user profile may later be updated to include accurate information, including replacing attributes that were previously flagged as synthetic or potentially synthetic. Step 316, as shown in FIG. 3, is optional, and in some embodiments, step 316 may be required.

At step 318, a broadcast notice is sent to third parties regarding the new user identity. The broadcast notice may include information relating to the new user profile, or information relating to one or more attributes associated with the new user profile. For example, if a new user profile is created, where an attribute (e.g., a social security number) is known to be fraudulent, the broadcast notice may include the synthetic attribute to third parties. The information may be used by the third parties for various purposes, including for screening credit requests and identifying requests that contain known synthetic attributes.

Figure 4:
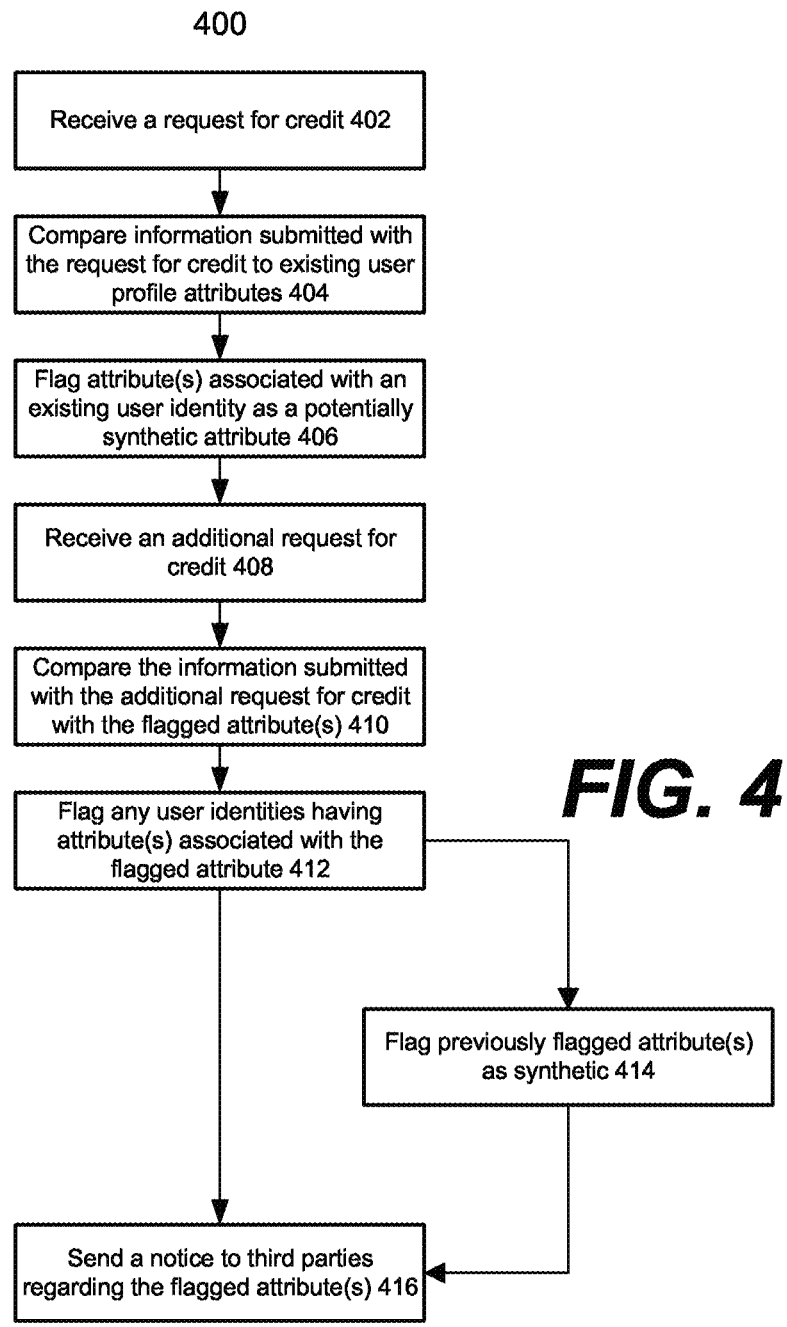
FIG. 4 shows another process for identifying a synthetic attribute according to an embodiment of the present disclosure.

FIG. 4 shows a process for identifying a synthetic identity according to an embodiment of the present disclosure. The user identity server may be used to perform some or all of the steps of the process shown, and in some embodiments, the synthetic identity service is located on user identity server and performs some or all of the steps of the process shown. In other embodiments, synthetic identity service may perform some or all of the steps of the process shown, and may be located on a server other than user identity server. In some embodiments, one or more APIs relating to the user identity server may be used to perform some or all of steps of the process shown.

The process shown in FIG. 4 differ from the process shown in FIG. 3, as the process shown in FIG. 4 does not involve the creation of a new user profile. In some embodiments, a new user profile is not created if logic, including logic on the user identity server or the synthetic identity service, determines that the information included in the credit request (for example the credit request received in step 402) is associated with one or more user profiles, and does not create a new user profile (or user identity) accordingly.

Steps 402 is similar to step 302, step 404 is similar to step 304, and step 408 is similar to step 310. The other steps shown in the process of FIG. 4 may differ from the steps shown in the process of FIG. 3, as described below.

At step 406, one or more attributes associated with an existing user profile may be flagged as synthetic or potentially synthetic. The user identity server may perform this step, and in some embodiments, the user identity server may also flag one or more user profiles associated with the attributes that have been identified and flagged. In the process shown in FIG. 4, an attribute is flagged as a potentially synthetic attribute. In some embodiments not shown, the flagged attribute may be flagged as a synthetic attribute, for example if the attribute was previously flagged as potentially synthetic (or synthetic), or if the attribute is associated with a user profile that was previously flagged as synthetic or potentially synthetic.

At step 410, the user identity server may compare the attributes (or information) included with the additional credit request with the flagged attributes associated with one or more existing user identities (or profiles). The comparison may include comparing a single attribute type to a single attribute type (e.g., comparing a name to a name associated with a user profile), or comparing multiple attribute types to multiple attribute types (e.g., comparing a name and an address to a name and an address associated with a user profile).

At step 412, one or more user identities (or user profiles) are flagged as a synthetic identity. The user identity server may flag existing identities, or the synthetic identity service may flag the user identity as synthetic.

At step 414, previously flagged attributes are flagged as synthetic. For example, if an attribute associated with one or more user profiles was previously flagged as a potentially synthetic attribute, and additional credit request is received that indicates that the flagged attribute (that is potentially synthetic) is synthetic, then the user identity server (or synthetic identity service located on a different server) may flag the previously flagged attribute as synthetic.

At step 416, a broadcast notice is sent to one or more third parties regarding the flagged attributes associated with one or more user profiles. The broadcast notice may be transmitted in a similar manner and include similar contents as the broadcast notice described in the context of step 318 of FIG. 3.

FIG. 5 shows a block diagram of a user profile that may include a synthetic identifier according to an embodiment of the present disclosure. User profile 500 may include one or more attributes, including personal name 502, personal address 504, personal phone number 506, personal social security number 508, and synthetic flag 510. In some embodiments, the user profile may not include a synthetic flag, and in other embodiments, the user profile may contain additional attributes, for example an e-mail address and a mobile phone number. In some embodiments, the user profile may also include attributes identifying relationships between one or more user profiles, for example if a first user profile and a second user profile both include the same personal phone number 506 or personal social security number 508. The synthetic flag 510 may include one or more statues, including a synthetic status and a potentially synthetic status. In some embodiments, a potentially synthetic status may not be indicated in any user profiles.

Figure 6:
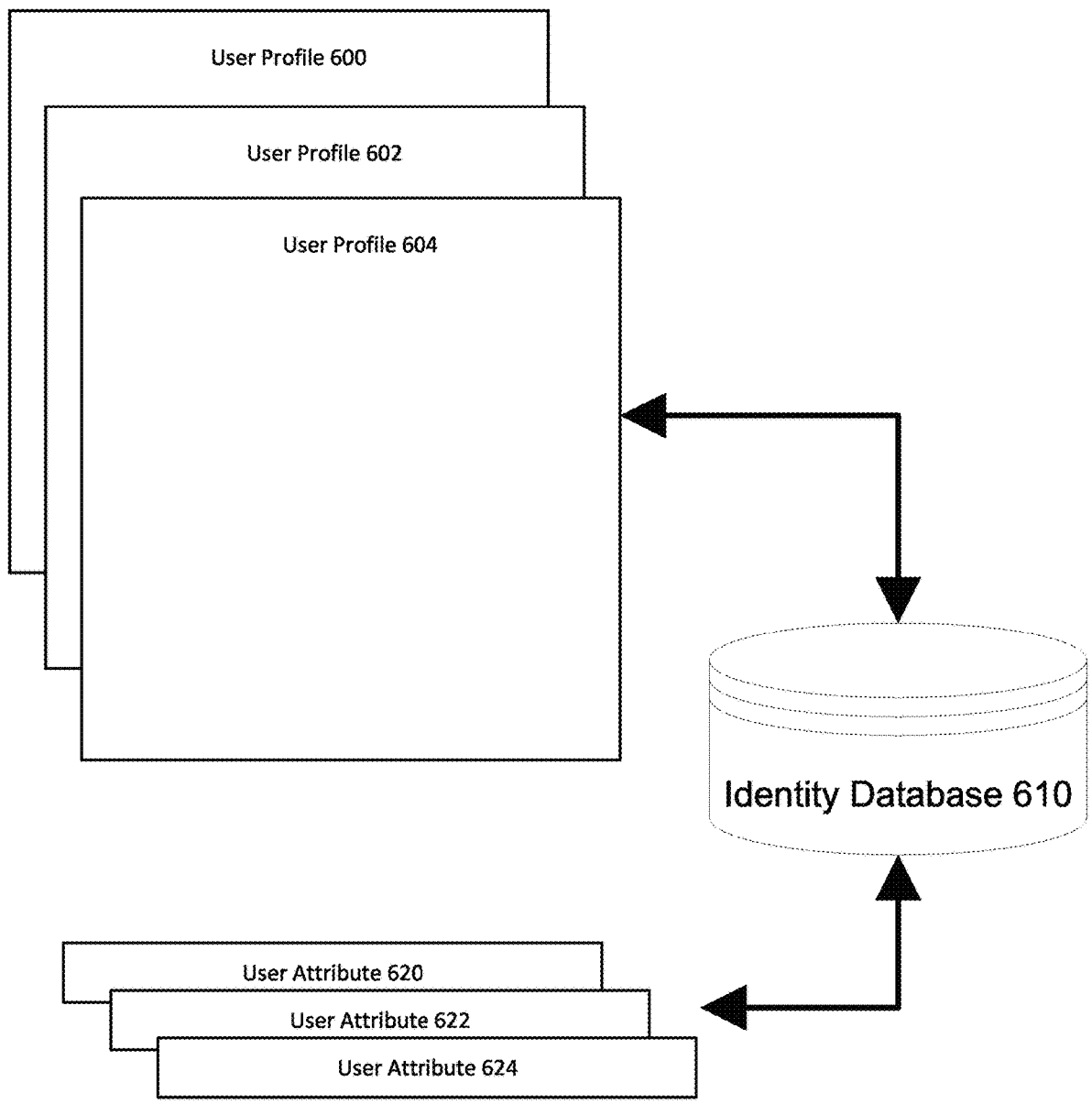
FIG. 6 shows a block diagram of storing user profiles and user attributes in a database according to an embodiment of the present disclosure.

FIG. 6 shows a block diagram of storing user profiles and user attributes in a database according to an embodiment of the present disclosure. In FIG. 6, an identity database 610 may store one or more user profiles, including user profile 600, user profile 602, and user profile 604. The user profile may include attributes, including attributes associated with a user profile as shown in FIG. 5. The identity database may store one or more user attributes, including user attribute 620, user attribute 622, and user attribute 624. The user attributes may relate to one or more attributes associated with a user profile as described in the present disclosure, for example a personal name or a personal address. The identity database 610 may also include logic for storing relationships between any of user attributes 620, user attribute 622, and user attribute 624 with user profile 600, user profile 602, and user profile 604. In some embodiments, identity database may store historical information relating to user profiles and user attributes. For example, the identity database may store how a user attribute, for example a social security number, has been associated with one or more user profiles over time. The user identity server may determine whether a user profile or attribute associated with a user profile is synthetic or potentially synthetic based on the historical information. In some embodiments, the historical information may be stored in another database, or in memory at a server, for example the user identity server.

Referring back to FIG. 2, display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology used for exchanging communications, for example ISA, EISA, PCI, PCI Express, NuBus, USB, Serial ATA and FireWire. Computer-readable medium 210 may be any medium that participates in providing instructions to processor(s) 202 for execution, including without limitation, non-volatile storage media, such as optical disks, magnetic disks, flash drives, etc., or volatile media, such as SDRAM and ROM.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language, for example Objective-C, Java, Swift, and C++, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, and communications capability, as well as other capabilities and characteristics of the device running the application.

While various embodiments have been described above, it should be understood that they have been presented by way of example and not limitation. Various changes in form and detail can be made therein without departing from the spirit and scope. For example, other steps may be provided or steps may be eliminated from the described flows, and other components may be added to or removed from the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

What is claimed is:

1. A method for detecting synthetic identities comprising:
storing a plurality of stored user attributes associated with one or more stored user identities in an identity database;
receiving a plurality of first user attributes associated with a first user identity;
comparing, by a user identity server, the plurality of first user attributes to the plurality of stored user attributes;
in response to the comparison, flagging matched attributes of the plurality of first user attributes as potentially synthetic attributes;
generating a notice comprising the potentially synthetic attributes;
transmitting the notice to one or more third-party servers;
receiving a response from at least one of the one or more third-party servers, the response comprising a synthetic identifier indicating at least one of the potentially synthetic attributes is associated with a second user identity;
flagging, based on the response, the first and second user identity as synthetic identities; and
generating a second notice comprising the flags first and second user identity and transmitting to the second notice to the one or more third party servers.

2. The method of claim 1, wherein the third-party servers are financial servers.

3. The method of claim 1, further comprising:
receiving a first request for credit, the first request comprising one or more user attributes;
comparing, by the user identity server, the one or more user attributes to the plurality of stored user attributes; and
in response to the comparison, flagging matched attributes of one or more user attributes as potentially synthetic attributes.

4. The method of claim 3, further comprising:
generating a notice comprising the one or more user attributes; and
transmitting the notice to the one or more third-party servers.

5. The method of claim 3, wherein receiving the first request for credit comprises receiving the first request for credit from one of the one or more third-party servers.

6. The method of claim 1, further comprising:
analyzing historical information associated with the potentially synthetic identity, wherein the historical information comprises changes to the potentially synthetic identity over time; and
flagging the potentially synthetic identity as a synthetic identity.

7. The method of claim 1, further comprising:
analyzing historical information associated with the potentially synthetic identity, wherein the historical information comprises changes to the potentially synthetic identity over time; and
flagging the potentially synthetic identity as an authentic identity.

8. The method of claim 1, further comprising:
receiving a plurality of third user attributes associated with a third user identity;
comparing, by the user identity server, the plurality of third user attributes to the plurality of stored user attributes;
in response to the comparison, flagging the third user identity as an existing user; and updating at least one of the plurality of stored user attributes associated with the existing user.

9. The method of claim 1, further comprising:
receiving a plurality of third user attributes associated with a third user identity;
comparing, by the user identity server, the plurality of third user attributes to the plurality of stored user attributes;
in response to the comparison, flagging the third user identity as a new user; and
generating the new user comprising the plurality of third user attributes in the plurality of stored user attributes.

10. A system for detecting synthetic identities comprising:
a processor; and
a non-transitory memory storing instructions that, when executed by the processor, cause the processor to perform processing comprising:
storing a plurality of stored user attributes associated with one or more stored user identities in an identity database;
receiving a plurality of first user attributes associated with a first user identity;
comparing, by a user identity server, the plurality of first user attributes to the plurality of stored user attributes;
in response to the comparison, flagging matched attributes of the plurality of first user attributes as potentially synthetic attributes;
generating a notice comprising the potentially synthetic attributes;
transmitting the notice to one or more third-party servers;
receiving a response from at least one of the one or more third-party servers, the response comprising a synthetic identifier indicating at least one of the potentially synthetic attributes is associated with a second user identity;
flagging, based on the response, the first and second user identity as synthetic identities; and
generating a second notice comprising the flags first and second user identity and transmitting to the second notice to the one or more third party servers.

11. The system of claim 10, wherein the third-party servers are financial servers.

12. The system of claim 10, wherein the processing further comprises:
receiving a first request for credit, the first request comprising one or more user attributes;
comparing, by the user identity server, the one or more user attributes to the plurality of stored user attributes; and
in response to the comparison, flagging matched attributes of one or more user attributes as potentially synthetic attributes.

13. The system of claim 12, wherein the processing further comprises:
generating a notice comprising the one or more user attributes; and
transmitting the notice to the one or more third-party servers.

14. The system of claim 12, wherein the processing for receiving the first request for credit comprises receiving the first request for credit from one of the one or more third-party servers.

15. The system of claim 10, wherein the processing further comprises:
analyzing historical information associated with the potentially synthetic identity, wherein the historical information comprises changes to the potentially synthetic identity over time; and
flagging the potentially synthetic identity as a synthetic identity.

16. The system of claim 10, wherein the processing further comprises:
analyzing historical information associated with the potentially synthetic identity, wherein the historical information comprises changes to the potentially synthetic identity over time; and
flagging the potentially synthetic identity as an authentic identity.

17. The system of claim 10, wherein the processing further comprises:
receiving a plurality of third user attributes associated with a third user identity;
comparing, by the user identity server, the plurality of third user attributes to the plurality of stored user attributes;
in response to the comparison, flagging the third user identity as an existing user; and
updating at least one of the plurality of stored user attributes associated with the existing user.

18. The system of claim 10, wherein the processing further comprises:
receiving a plurality of third user attributes associated with a third user identity;
comparing, by the user identity server, the plurality of third user attributes to the plurality of stored user attributes;
in response to the comparison, flagging the third user identity as a new user; and
generating the new user comprising the plurality of third user attributes in the plurality of stored user attributes.

19. A system for detecting synthetic identities comprising:
a processor; and
a non-transitory memory storing instructions that, when executed by the processor, cause the processor to perform processing comprising:
storing a plurality of stored user attributes associated with one or more stored user identities in an identity database;
receiving a request for credit comprising a plurality of first user attributes associated with a first user identity;
comparing, by a user identity server, the plurality of first user attributes to the plurality of stored user attributes;
in response to the comparison, flagging matched attributes of the plurality of first user attributes as potentially synthetic attributes;
generating a notice comprising the potentially synthetic attributes;
transmitting the notice to one or more third-party servers;
receiving a response from at least one of the one or more third-party servers, the response comprising a synthetic identifier indicating at least one of the potentially synthetic attributes is associated with a second user identity;
flagging, based on the response, the first user identity as a synthetic identity; and generating a second notice comprising the flags first and second user identity and transmitting to the second notice to the one or more third party servers.

20. The system of claim 19, wherein the processing further comprises:
in response to flagging the first user identity as the synthetic identity, rejecting the request for credit.

* * * * *